UNITED STATES PATENT OFFICE.

SHELDON P. THACHER, OF WEEHAWKEN, NEW JERSEY, ASSIGNOR TO REVERE RUBBER COMPANY, A CORPORATION OF RHODE ISLAND.

PROCESS FOR VULCANIZING RUBBER AND PRODUCT OBTAINED THEREBY.

1,312,144.          Specification of Letters Patent.        Patented Aug. 5, 1919.

No Drawing. Original application filed July 11, 1917, Serial No. 179,801. Divided and this application filed January 5, 1918. Serial No. 210,518.

*To all whom it may concern:*

Be it known that I, SHELDON P. THACHER, a citizen of the United States, residing at Weehawken, county of Hudson, and State of New Jersey, have invented certain new and useful Improvements in Processes for Vulcanizing Rubber and Products Obtained Thereby, of which the following is a full, clear, and exact description.

This invention relates to processes for vulcanizing rubber or similar material such as gutta percha, balata, synthetic rubber, and materials commonly classed under the term "rubber" and to the products obtained thereby. It is more particularly directed to a process for vulcanizing rubber in the presence of an accelerator employing nitro-derivatives of the benzene series as vulcanizing agents partially or wholly eliminating the use of sulfur or sulfur compounds as vulcanizing ingredients; and to the products resulting therefrom.

This application is a division of my co-pending application, Serial No. 179,801, filed July 11, 1917.

The accelerators mentioned and claimed in my co-pending application referred to have in themselves a neutral or a whitening action and ordinarily where other color is desired in the vulcanized rubber, suitable coloring ingredients are added.

An object of the present invention is to employ an agent capable of performing the double function of accelerating vulcanization and coloring the resultant product.

Heretofore, the coloring of rubber articles has been restricted to colors obtained only by those materials upon which the sulfur used in vulcanization would have no deleterious action. By the employment of vulcanizing agents such as the nitro-derivatives of the benzene series, containing no sulfur, I am enabled to use such coloring and accelerating agents as white lead, lead chromate, and red lead, and other metallic coloring materials, which could not be used with sulfur as a vulcanizing agent due to their tendency to form metallic sulfids, thus destroying their color.

Red lead particularly has been found to be a desirable coloring and accelerating agent, not only accelerating the vulcanization by nitro-compounds but also acting to provide a very desirable color to the finished product.

In carrying out the process using such an accelerator one hundred parts of rubber are preferably milled with twenty parts of red lead and three parts of dinitrobenzene, and the mixture is then subjected to any of the treatments ordinarily used in sulfur vulcanization, such for example, as forming the mixture into the desired shapes or articles and subjecting the same to heat and pressure as in the vulcanization by sulfur. The product resulting from this treatment possesses the generally excellent characteristics of compounds vulcanized by the nitro-derivatives and in addition has the color of red lead. The use of red lead as a combined accelerator and coloring agent has not been found feasible heretofore when employed with sulfur due to the fact that the color is destroyed in the vulcanizing process through the formation of lead sulfid, and that the accelerator continues curing the rubber for a considerable period after the vulcanizing process itself is complete. Red lead when used in dinitrobenzene does not turn black and the cure is substantially complete at the termination of the vulcanizing process.

No claim is made to the employment of nitro-compounds or the like *per se* as vulcanizing agents.

As many apparently widely different embodiments of this invention may be made without departing from the spirit thereof, it is to be understood that I do not intend to limit myself to the specific form of the invention as set forth except as indicated in the appended claims.

Having thus described my invention what I claim and desire to protect by Letters Patent is:

1. A process for treating rubber or similar material which comprises mixing an organic vulcanizing agent and red lead with rubber and vulcanizing the mixture.

2. A process for treating rubber or similar materials which comprises mixing dinitrobenzene and red lead with rubber and vulcanizing the mixture.

3. A process for treating rubber or similar materials which comprises mixing a vulcanizing agent containing no sulfur and red lead with rubber and vulcanizing the mixture.

4. As a new compound, a vulcanized rubber comprising products of the action of red lead and a vulcanizing agent containing no sulfur.

5. As a new compound, a vulcanized rubber comprising products of the action of red lead and an organic vulcanizing agent.

6. As a new compound, a vulcanized rubber comprising products of the action of red lead and a vulcanizing agent consisting of an aromatic nitro-compound.

7. As a new compound, a vulcanized rubber comprising products of the action of red lead and dinitrobenzene.

Signed at New York, county of New York, State of New York, this second day of January, 1918.

SHELDON P. THACHER.